United States Patent
Kida et al.

[19]

[11] Patent Number: 6,067,217

[45] Date of Patent: *May 23, 2000

[54] CURRENT LIMITER

[75] Inventors: Junzo Kida, Hitachi; Hiroshi Arita, Mito, both of Japan

[73] Assignee: Hitachi, Ltd., Tokyo, Japan

[*] Notice: This patent is subject to a terminal disclaimer.

[21] Appl. No.: 09/243,478

[22] Filed: Feb. 3, 1999

Related U.S. Application Data

[63] Continuation of application No. 08/665,413, Jun. 18, 1996, Pat. No. 5,883,774.

[30] Foreign Application Priority Data

Jun. 20, 1995 [JP] Japan ..................................... 7-152967
May 23, 1996 [JP] Japan ..................................... 8-128109

[51] Int. Cl.$^7$ ....................................................... H02H 9/00
[52] U.S. Cl. ............................... 361/58; 361/47; 361/93.9
[58] Field of Search ........................... 361/42–43, 47–48, 361/35, 38, 58, 5, 7–10, 93.1, 93.5, 93.7, 93.9, 94, 98, 100–102, 118, 126, 19; 336/170

[56] References Cited

U.S. PATENT DOCUMENTS

| | | | |
|---|---|---|---|
| 3,728,618 | 4/1973 | Nimes ...................................... | 324/510 |
| 3,921,038 | 11/1975 | Kernick et al. .......................... | 361/100 |
| 4,151,460 | 4/1979 | Seese et al. .............................. | 324/529 |
| 4,580,186 | 4/1986 | Parker et al. ............................. | 361/42 |
| 4,618,906 | 10/1986 | Paice et al. ................................. | 361/5 |
| 4,704,652 | 11/1987 | Billings ...................................... | 361/5 |
| 5,179,489 | 1/1993 | Oliver ....................................... | 361/35 |
| 5,452,170 | 9/1995 | Ohde et al. ............................... | 361/13 |

*Primary Examiner*—Michael J. Sherry
*Attorney, Agent, or Firm*—Beall Law Offices

[57] ABSTRACT

A current limiter used for stable control of an electric power system, and particularly applied to a high voltage of the electric power system, has a reduced voltage for suppressing the overcurrent of the electric power system. The current limiter is not enlarged so that the current limiter secures the insulation of the voltage withstanding level, and the current limiter is easy to be introduced to the system. A limiting device is inserted between a low potential terminal of a winding of a star-connection of a three-phase transformer that has at least one winding of the star-connection and a ground point.

37 Claims, 10 Drawing Sheets

CURRENT LIMITER

This is a continuation application of U.S. Ser. No. 08/665,413, filed Jun. 18, 1996, now U.S. Pat. No. 5,883,774.

BACKGROUND OF THE INVENTION

This invention is related to a current limiter used for stable control of an electric power system, and particularly to a current limiter which is applied to a high voltage of the electric power system.

DESCRIPTION OF THE PRIOR ART

In the case of a fault, such as a short circuit or a ground fault, in an electric power system, an overcurrent of several times or more than that of an ordinary electric current flows through the power system, resulting in a reduced voltage in the system so that stress is generated by heat or electromagnetic force in the power transmission equipment. To prevent this fault, a current limiter is employed for quickly suppressing the overcurrent caused by the system fault. The current limiter suppresses the overcurrent faster than a breaker interrupts the overcurrent. Various methods have been proposed, such as a method for commutating the overcurrent to the limiting element by using a high-speed switch, and a method utilizing a quenching phenomenon of a superconducting device. As shown in FIG. 3, current limiters 1 are inserted into power transmission lines 3 of the system so as to suppress a fault current 4a that flows into fault point 4. An example of a structure of a conventional current limiter applied to an electrostatic induction system is described in Japanese Patent Laid-open Print No. 60-207421. Because the system itself is used as the electric power device and is ineffectively grounded, and because a high-voltage system (for example, having a system voltage of 154 kV or more) is an effectively grounded system, the conventional current limiter cannot be applied thereto. In addition, the structure cannot control the electric current for every phase, and thus, the fault current that flows into the electric power system causes the majority (about 80% or more) of one line ground faults, and it has not been possible to prevent short circuit faults due to the one line ground faults.

In the case where the overcurrent limiting protection is performed by using the current limiter shown in FIG. 3, at least a voltage 3 v which corresponds to the withstand voltage between the system and ground is applied to the current limiter. When the current limiter has an ability of the withstand voltage corresponding to the voltage between the system and ground, it is necessary to lengthen the insulation distance between ground and the system, leading to an enlargement of the whole system. In using a superconducting device, it is difficult to secure the insulation corresponding to the system voltage, because the withstand voltage of the liquid helium, etc, used for cooling of the superconducting device is considerably low as compared with that of air, etc.

SUMMARY OF THE INVENTION

Consequently, an object of this invention is to solve the above problems and to easily apply a current limiter to an electric power system. In this invention, even in the case where a solid-state switch is used for controlling electrons that flow through the current limiter, the solid-state switch is prevented from being destroyed by the overcurrent.

To solve the above mentioned problems, the current limiter of the present invention includes a current limiting device inserted between a low potential terminal of a winding of a star-connection of a three-phase transformer and a grounding point thereof. The current limiter of the invention further include a controller for controlling the electric current that flows into the limiting device. The limiting device comprises a main circuit switch inserted in the power line and a solid-state switch connected in parallel with the main circuit switch.

The current limiter further comprises power line abnormality detecting means for detecting an electric power abnormality that occurs in the power line, on-abnormality instruction means for giving an instruction to open the main circuit switch in response to a detected output by the power line abnormality detecting means and for giving an instruction to close the solid-state switch at the time of an abnormal current, commutating current detection means for detecting the electric current flowing in the solid-state switch, and on-and-off means for interrupting and driving the solid-state switch, when the detected electric current of the commutation detection means shows a normal value in the process of opening the main circuit switch.

The current limiter may also include main circuit electric current detection means for detecting the electric current of the main circuit, main circuit electric current judgment means for judging whether the detected output of the main circuit electric current detection means exceeds the preset value of the abnormality, commutating current judgment means for judging whether the detected output of the commutating detection means exceeds the preset value of the abnormality, and interrupting instruction means for giving the instruction of the interruption to the solid-state switch in the process of opening the main circuit switch, when judgment outputs of both the main circuit electric current judgment means and the commutation electric current judgment means are negative.

Furthermore, the current limiter may include an abnormal current detecting means for detecting the abnormal current in the power line, an interrupting instruction means for giving the instruction of the interruption to the solid-state switch in response to the detected output of the abnormal electric current detection means, a main circuit current detecting means for detecting the electric current flowing in the solid-state switch, and means for holding the conduction state of the solid-state switch when the detected electric current of the main circuit electric current detection means is an abnormal value in the process of turning off the solid-state switch.

By use of the above means, the current limiting device of the current limiter prevents a system voltage from directly loading. And, the withstand voltage of the limiting device itself becomes the same as the voltage at the limiting device, whose voltage is sufficiently lower than the system voltage. Thus, the fault current can be suppressed without loading a high voltage to the current limiter. When the electric current flowing into the solid-state switch is the normal value in the process of opening the main circuit switch, the destruction of the solid-state switch can be prevented by the on-off operation of the solid-state switch. Under the condition that the electric current normally flows in the solid-state switch and the current value of the main circuit is normal, by operating the solid-state switch on-and-off, the protection of the solid-state switch is further improved. When the detected electric current of the main circuit is abnormal in the process of interrupting the solid-state switch, however, by holding the conduction state of the solid-state switch, the solid-state switch is prevented from being damaged.

DETAILED DESCRIPTION OF THE PREFERRED EMBODIMENTS

Figure 1:
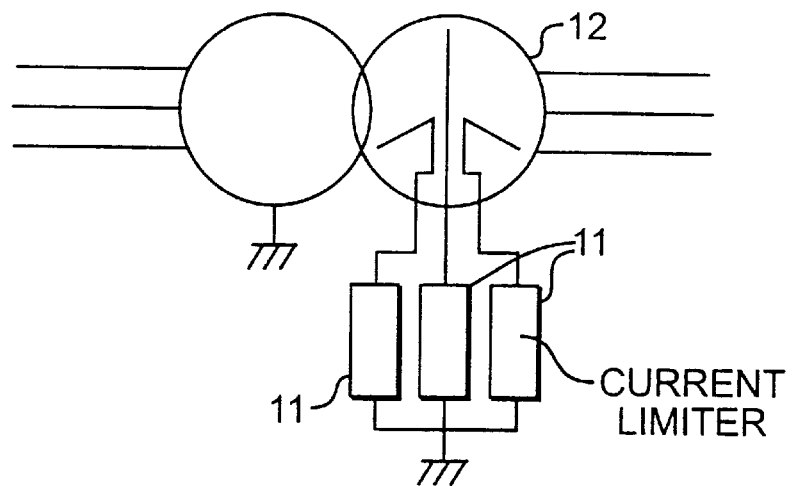
FIG. 1 and FIG. 20 are constitutional examples of current limiters of this invention.

FIG. 1 is a constitutional example of a current limiter constructed according to the teachings of the present invention. The current limiter is composed of current limiting device 11 inserted between a low potential terminal of the winding of a star-connection of transformer 12 and a ground point. Current limiting device 11 usually has a low impedance, in the case where an overcurrent flows due to a short circuit or a ground fault, etc, the overcurrent is at once suppressed by increasing the impedance. Transformer 12 has only to comprise at least one star-connection. By connecting current limiting device 11 in series with this star-connection, the overcurrent can be suppressed.

Figure 2:
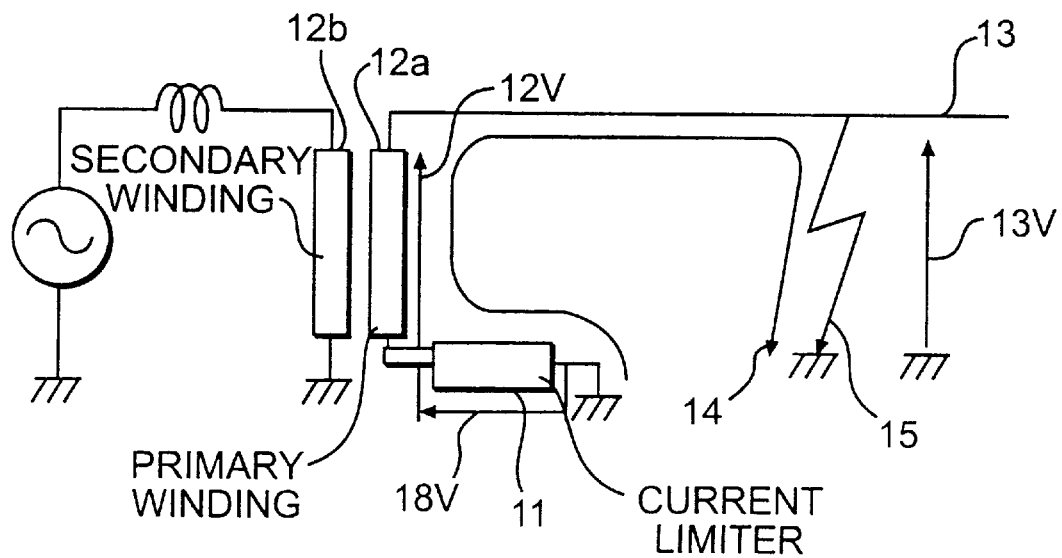
FIG. 2 is an example of an operation of a current limiter of this invention.
Figure 3:
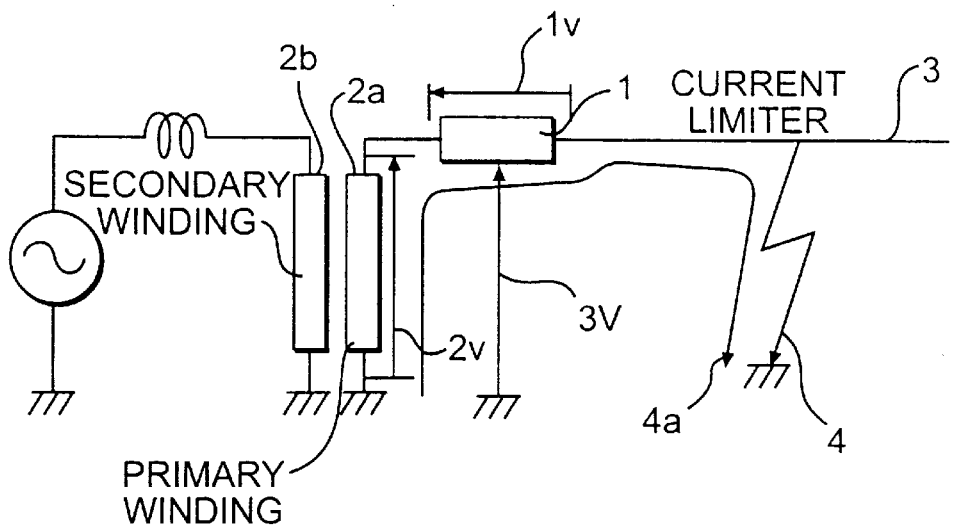
FIG. 3 is an example of an operation of a conventional current limiter.

FIG. 2 is an example of an operation of the current limiter of this invention. This figure shows a three-phase circuit in a single phase. In a transformer composed of primary winding 12a and secondary winding 12b, current limiting device 11 is inserted between the low potential terminal of primary winding 12a and ground. Supposing that overcurrent 14 flows because of a short circuit at fault point 15 of power line 13, overcurrent 14 flows in fault point 15 through current limiting device 11 and primary winding 12a of the transformer. At this time, if the impedance of current limiting device 11 is increased, overcurrent 14 can be made small. When the system is normally driving, power line 13 has voltage withstand level 13 v. Voltage 18 v at current limiting device 11 occurs by the impedance of current limiting device 11 and overcurrent 14, when overcurrent 14 is suppressed.

The following is a description of the relationship between withstand voltage 13 v of the system and voltage 18 v of the current limiting device.

When the withstand voltage between the system and earth ground is V and the short circuit current is I, impedance X on the power source side is expressed as X=V/I. When the impedance of limiting device 1 is X1, short circuit electric current I1, which is limited by using the limiting device, becomes I1=V/(X+X1). Therefore, when the voltage of the current limiting device is denoted as V1, it is expressed as V1=X1×I1. For example, supposing that a case where short circuit electric current 63 kA in the 500 kV system is suppressed to 50 kA. At this time, withstanding voltage 13 v=V=500/√3 kV=288.7 kV, short-circuit electric current (I)=63 kA, and limited short-circuit electric current (I1)=50 kA; therefore, impedance X on the power source side becomes 4.58 Ohms, and impedance X1 of the current limiting device becomes 1.19 Ohms. As a result, voltage V1 of the current limiting device becomes V1-59.6 kV. As is shown in this example, the withstand voltage V is larger than voltage V1 of the limiting device, and withstand voltage 13V is generally higher than voltage 18 v. With regard to the current limiter of the present invention, it is understood that the structure of the current limiting device 11 does not have a high withstand voltage 13 v. Consequently, the withstand voltage of current limiting device 11 has only to consider voltage 18 v.

In addition, as for the withstand voltage of the low potential terminal of primary winding 12a that is connected with current limiting device 11, as is described in "Standards of the Japanese Electrotechnical Committee JEC-204-1978", it is normally designed by alternating 70 kV or more. Therefore, voltage 18 v of current limiting device 11 is lower than the withstand voltage of the low potential terminal of the transformer, and it is not necessary to make a special processing to secure the withstand voltage of the winding of the transformer.

Application examples of the current limiting devices used in the current-limiters of this invention are shown from FIG. 4 to FIG. 17.

Figure 4:
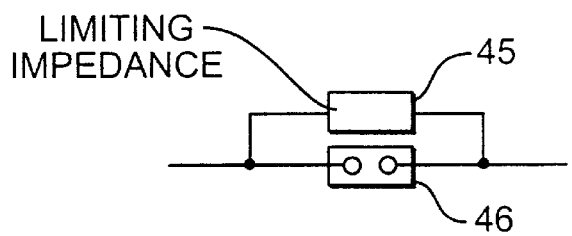
FIG. 4, FIG. 5, FIG. 10, FIG. 13, FIG. 14 and FIG. 19 are examples of current limiting devices used for current limiters of this invention.

FIG. 4 shows the current limiting device comprising mechanical switch 46 used as a mechanical contactor, and limiting impedance 45 which is connected in parallel therewith. The electric current usually flows in the mechanical switch when mechanical switch 46 is closed. When the over current is limited, mechanical switch 46 is opened, and the electric current is commutated in current limiting impedance 45. With this mechanical switch, by lengthening the distance between the contacting points of the mechanical switch, or by introducing an arc between contact points into the arc chute so that the voltage of the arc becomes high, the overcurrent can be suppressed.

Figure 5:
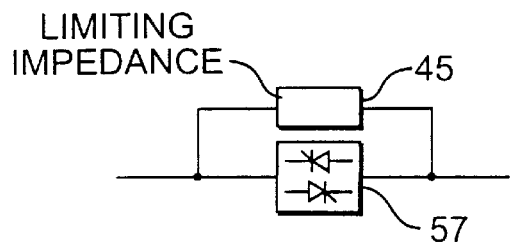

FIG. 5 is an example of the current limiting device comprising solid-state switch 57. By use of solid-state switch 57, the operation speed of the current limiting device can be made higher than by using the case of the mechanical switch. As particularly solid-state switch 57, if a switched valve device such as a gate turnoff thyristor is used, it is possible to make the operation time 1 ms or less for example. It is also possible to use an ordinary thyristor by providing excitation equipment.

Figure 6:
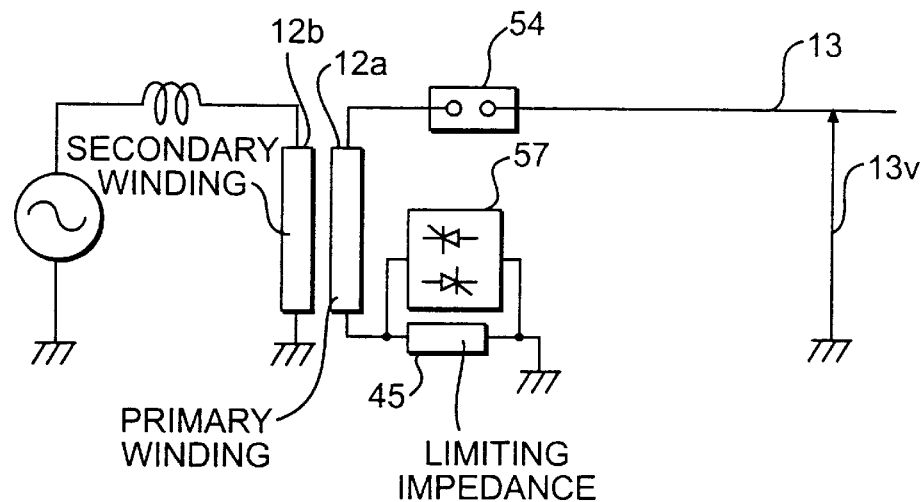
FIG. 6 is a concrete circuit constitutional example of a current limiter having the limiting device of this invention shown in FIG. 5.

FIG. 6 shows an example of a current limiting device of the current limiter according to the invention as shown in FIG. 5. In FIG. 6, the current limiting device shown in FIG. 5 is connected between the low potential terminal of transformer winding 12a and ground. In addition, breaker 54 is inserted between the terminal at a high-voltage side of transformer winding 12a and power line 13. As for this breaker 54, in case of protecting against the short-circuit, the current limiting device itself does not have an ability for interrupting the electric current. Therefore, breaker 54 interrupts the electric current, if it is necessary to separate the fault section from the system by finally interrupting the fault current.

Figure 7:
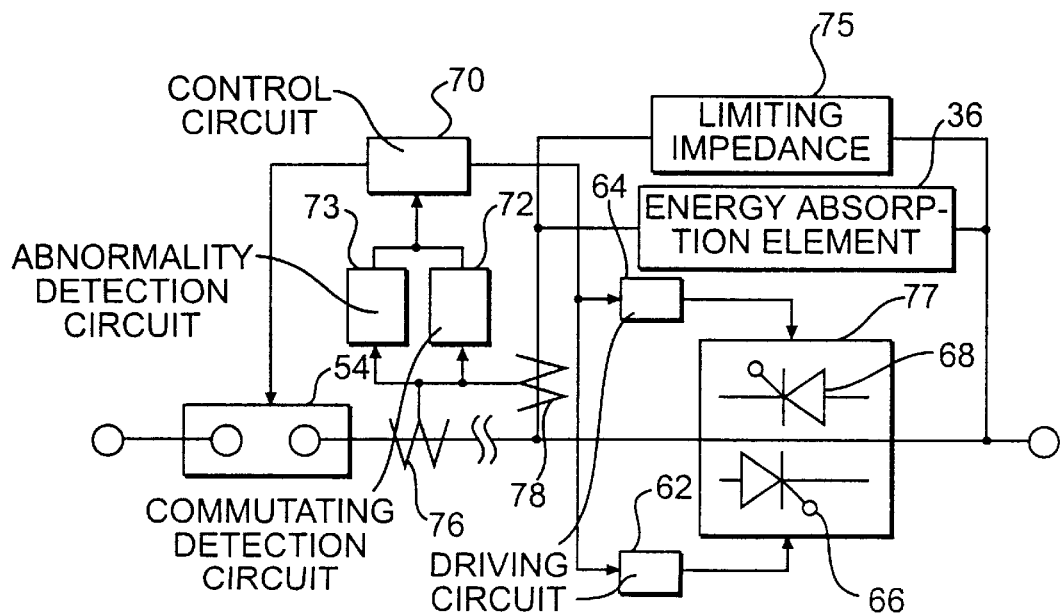
FIG. 7 is an example of the current limiting device and its control system shown in FIG. 5.

FIG. 7 shows the current limiting device and its control system. In this example, solid-state switch 77 is inserted in the main circuit and limiting impedance 75 is connected in parallel with solid-state switch 77. In addition, in order to suppress the overvoltage that occurs at the solid-state switch, energy absorption element 36 is connected in parallel with solid-state switch 77. In each element for controlling the forward direction electric current and the reverse electric current, switching signals are supplied to each of the gates from driving circuits 62 and 64. On the other hand, in the main circuit, provided near breaker 54 is electric current detector 76, which comprises the main circuit electric current detecting means for detecting the electric current flowing in the main circuit. Near solid-state switch 77 is electric current detector 78, the commutation detecting means for detecting the electric current flowing in solid-state switch 77. Further, electric current detectors 76 and 78 are installed at relatively left side from holding primary winding 12a. The detected outputs of each of the electric current detectors 76 and 78 are supplied to abnormality detection circuit 73 and commutating detection circuit 72. In this example, when the fault is detected by abnormality detection circuit 73, while the interruption is instructed to solid-state switch 77 from control circuit 70, the electric current flowing in solid-state switch 77 is observed by overcurrent detector 76 in the process of turning off solid-state switch 77. When the detection electric current of electric current detector 76 is an abnormal value, solid-state switch 77 holds the conduction state. Therefore, in this example, when solid-state switch 77 exceeds the interruption ability at the time of the accident, the electric current is turned off, i.e. the electric current can be prevented from flowing, and the reliability of solid-state switch 77 can be improved. When the time for holding solid-state switch 77 is continued beyond the preset time, breaker 54 is turned off, and solid-state switch 77 can be protected.

Figure 8:
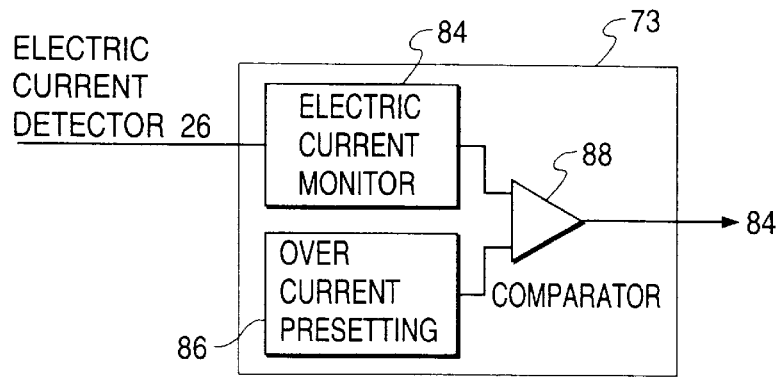
FIG. 8 is an example of a block structure of an electric current detection circuit of a current limiting device used for a current limiter of this invention.

As is shown in FIG. 8, abnormality detection circuit 73 is constituted by electric current monitoring part 84, overcurrent presetting part 86 and comparator 88. Electric current monitoring part 84 is composed of an input processing so as to do a filter processing, etc, to cut harmonic components of the detected electric current of electric current detector 76. Overcurrent presetting part 86 is set up so that the overcurrent value corresponds to the short-circuit (for example); in other words, the value of an abnormality related to the electric power supply of the main circuit. Comparator 88 compares the values between the output of electric current monitoring part 84 and the preset value of overcurrent presetting part 86. When the output of electric current monitoring part 84 exceeds the preset value, comparator 88 outputs a high-level abnormality detection signal to control circuit 84 as the abnormality occurs. That is, electric current detector 26 and abnormality detection circuit 73 constitute the abnormality detection means.

In case of judging the abnormality, instead of the method of judging the level of the electric current, a method for detecting the changed part of the electric current can be adopted. That is, by observing the changed amount of the electric current with electric current monitor part 84 and by setting the preset value to overcurrent presetting part 86, whose value corresponds to that of the changed amount of the electric current at the time of the abnormality, the abnormality can be detected from the changed amount of the electric current.

Figure 9:
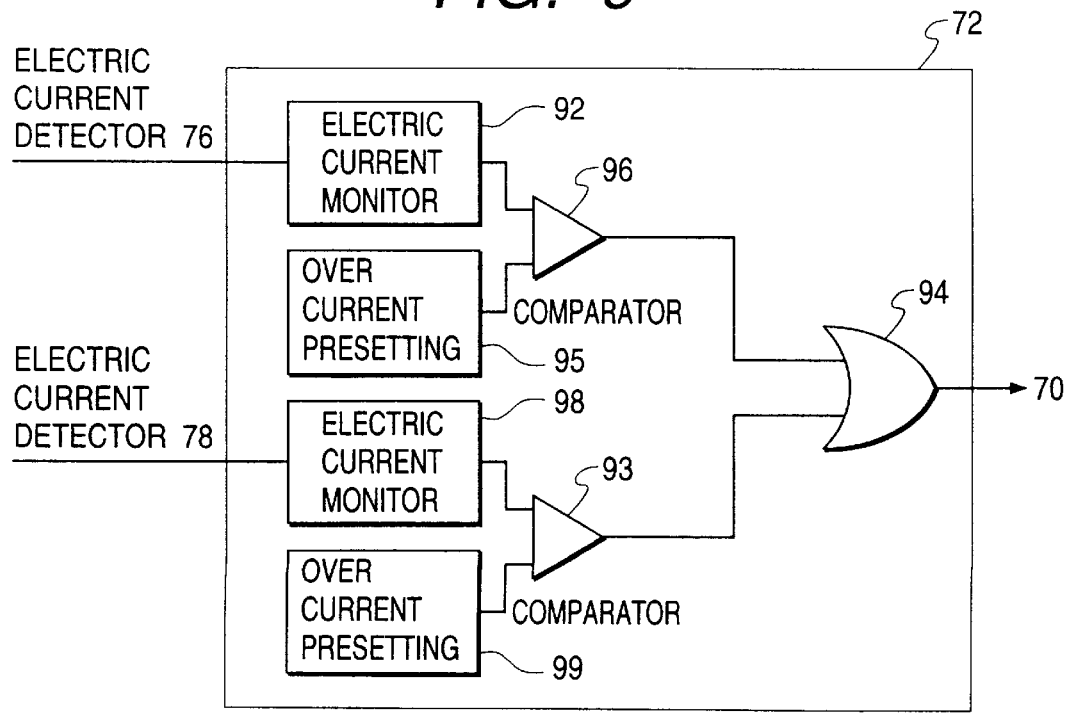
FIG. 9 is an example of a block structure of a commutation detection circuit of a current limiting device used for a current limiter of this invention.

As shown in FIG. 9, commutating detection circuit 72 is constituted by electric current monitor part 92, overcurrent presetting part 95, comparator 96, electric current monitor part 98, overcurrent presetting part 99, comparator 93 and OR circuit 94. Electric current monitor part 92 takes in the detected current of electric current detector 76 and is to carry out the input processing (such as filter processing, etc.), in order to cut the harmonic components of this electric current. Overcurrent presetting part 95 sets the overcurrent value at the time of the commutating operation. That is, set is the preset value showing the abnormality of the electric current of the main circuit at the time of the commutating operation. This preset value is larger than another preset value of overcurrent presetting part 86.

Comparator 96 compares the values between the output of electric current monitoring part 92 and the preset value of overcurrent presetting part 95, and when the output of electric current monitoring part 92 exceeds the preset value, comparator 96 outputs a high-level signal showing a commutation abnormality to OR circuit 94. In other words, the electric current monitor part 92, overcurrent presetting part 94 and comparator 96 constitute the main circuit electric current judgment means.

On the other hand, electric current monitor part 98 takes in the detected electric current of electric current detector 78 and performs the input processing (such as the filter processing) in order to cut the harmonic components of this electric current. Overcurrent presetting part 99 sets up the overcurrent value showing the abnormal value of the electric current flowing in solid-state switch 77. Comparator 93 compares the values between the output of electric current monitoring part 98 and the preset value of overcurrent presetting part 99, and when the output of electric current monitoring part 98 exceeds the preset value, comparator 93 outputs a high-level signal showing a commutation abnormality to OR circuit 94. That is, the electric current monitor part 98, overcurrent presetting part 99 and comparator 93 constitute the commutation judgment means. OR circuit 94 outputs a high-level commutating abnormality signal to controlling circuit 70, when a high-level signal is input from comparator 96 or comparator 93. Except for the above mentioned case, OR circuit 94 outputs a low level signal.

Figure 10:
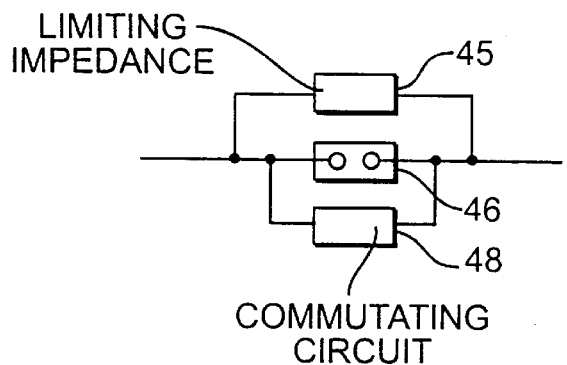

FIG. 10 is an example of the current limiting device where commutation circuit 48 is provided in the current limiting device shown in FIG. 4. When the current limiting device is composed of mechanical switch 46, electric current flowing in this switch cannot be turned off until a zero cross point basically occurs in the electric current. Consequently, when the alternating 50 Hz electric current is interrupted, it takes 10 ms at most from the beginning of the switching operation in order to interrupt the current until the electric current is interrupted. Therefore, to realize the high-speed current limit of the overcurrent by shortening the electric current interruption time, commutation circuit 48, which forcibly makes the zero cross point of the electric current that flows in the switch, has only to be connected in parallel with mechanical switch 46 as shown in FIG. 10. The commutation circuit 48 method may be carried out by making the zero cross point of the electric current by providing the electric current circuit in order to inject the backward current that flows in the switch, making the zero cross point of the electric current by providing the electric current circuit to flow a vibrative electric current to the switch, and so on.

Figure 11:
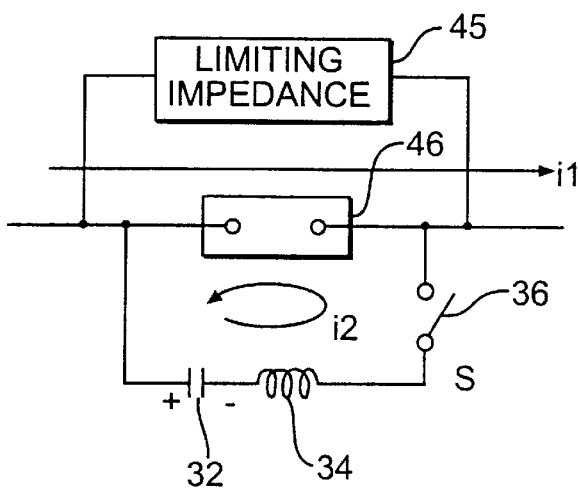
FIG. 11 is an example of a commutating circuit used for a current limiter of this invention.

FIG. 11 shows a concrete circuit example of commutating circuit 48. This circuit charges capacitor 32, and when the short-circuit is detected, switch S 36 is closed, and a backward current flows in CB 46. As the circuit makes an electric current zero cross point earlier than the original zero cross point for the short-circuit current, the current is interrupted. In the past by this circuit, in the case where the abnormality occurs, after the first wave of the abnormal electric current passed away and the abnormal current became zero, commutating circuit 48 was closed and current-limiting impedance 45 operated; therefore, the abnormal current flowed during the term. But, according to this invention, CB 46 opens and current-limiting impedance 45 operates at once after the abnormality is detected.

Figure 12A:
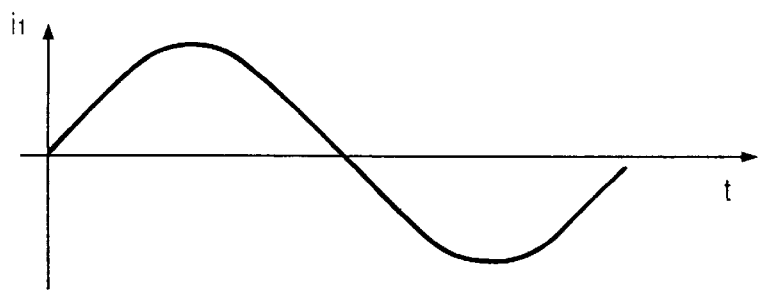
FIGS. 12a to 12d show electric current wave forms in a commutating circuit for a current-limiter of this invention.
Figure 12B:
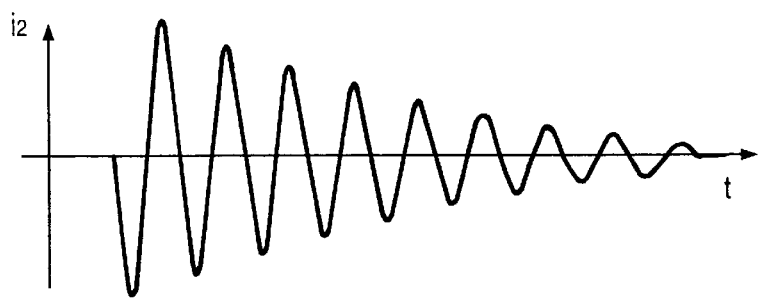
Figure 12C:
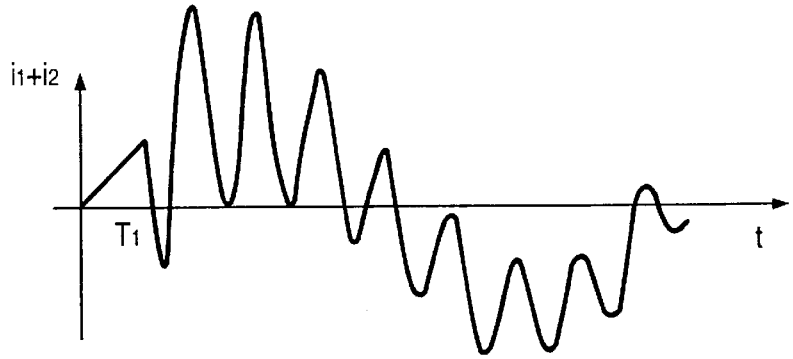
Figure 12D:
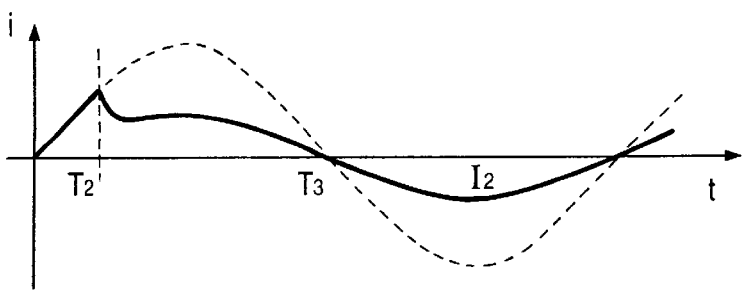

FIGS. 12(a)–12(d) are graphs showing effects of commutating circuit 48. FIG. 12(a) denotes electric current i1 that flows in breaker 46 and FIG. 12(b) indicates electric current i2 that flows through the commutating circuit. FIG. 12(c) shows the electric current that flows in actual breaker 46 comprising these electric currents i1 and i2. Because the zero cross point can be made forcibly, breaker 46 operates at the time T1, an open circuit occurs, and the current-limiting impedance 45 is effective after the open circuit. FIG. 12(d) is a comparison between short-circuit current I1 in case of not operating the current limiter and limited electric current I2 flowing in the whole system in case of operating the current-limiter.

As is mentioned above, breaker 46 and current-limiting impedance 45 come to operate at the time T2. If there is no commutation circuit 48, the current is not limited until the time T3 when breaker 46 opens. However in this example, as soon as the short-circuit is detected, the zero cross point of the voltage is made to breaker 46, and the current-limiting operation can be operated at the time T2.

Figure 13:
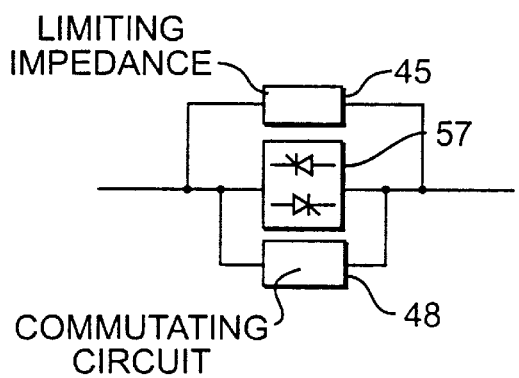

FIG. 13 is an example of a current limiting device comprising commutating circuit 48 in the current limiting device shown in FIG. 5. When a non-switched valve device like a thyristor is employed as solid-state switch 57, the time for interrupting the electric current of solid-state switch 57 becomes long, as when the current limiting device uses the mechanical switch as shown FIG. 10; therefore, the current limiting of the overcurrent becomes slow. To shorten the time for interrupting the electric current as in the circuit shown in FIG. 10, commutation circuit 48, which forcibly makes the zero cross point of the electric current that flows in the switch, has only to be connected in parallel with solid-state switch 57.

Figure 14:
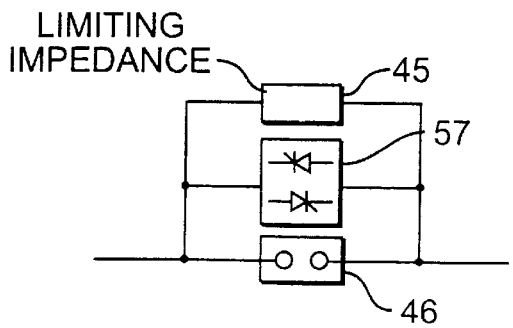

FIG. 14 is an example of the current limiting device comprising current-limiting impedance 45, mechanical switch 46 and solid-state switch 57, connected in parallel therewith. In this method, the electric current at normal times flows in mechanical switch 46 for suppressing a power loss to the minimum, but when the overcurrent flows, mechanical switch 46 is opened and the electric current is commutated to solid-state switch 57, and the overcurrent is limited by high speed breaking with solid-state switch 57. At this time, the interruption can be achieved at a higher speed by using a switched valve device such as solid-state switch 57.

Figure 15:
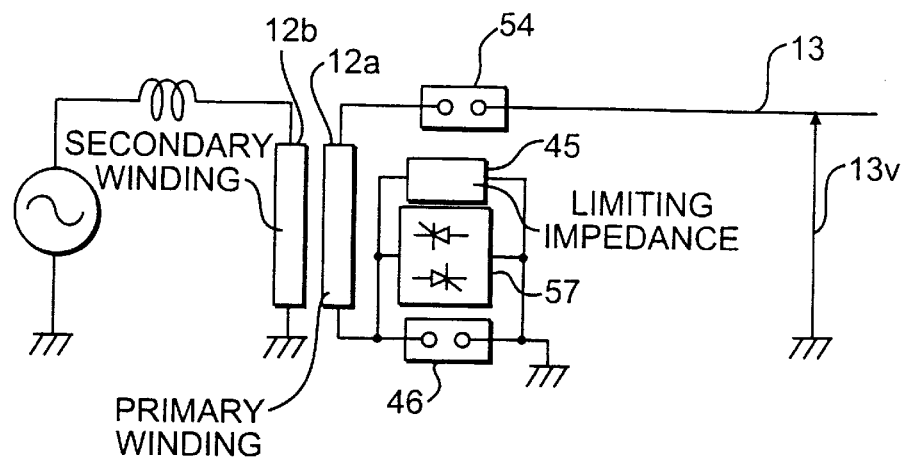
FIG. 15 is a concrete circuit constitutional example of a current limiter having the current limiting device of this invention shown in FIG. 14.

FIG. 15 shows an example in the case where the current limiting device shown in FIG. 14 is applied to the current limiter of this invention. In FIG. 15, the current limiting device shown in FIG. 14 is connected between the low potential terminal of transformer winding 12a and ground. In addition, breaker 54 is inserted between the high potential terminal of transformer winding 12a and power transmission line 13. This breaker 54 is used to turn off a fault current as shown in FIG. 6.

Figure 16:
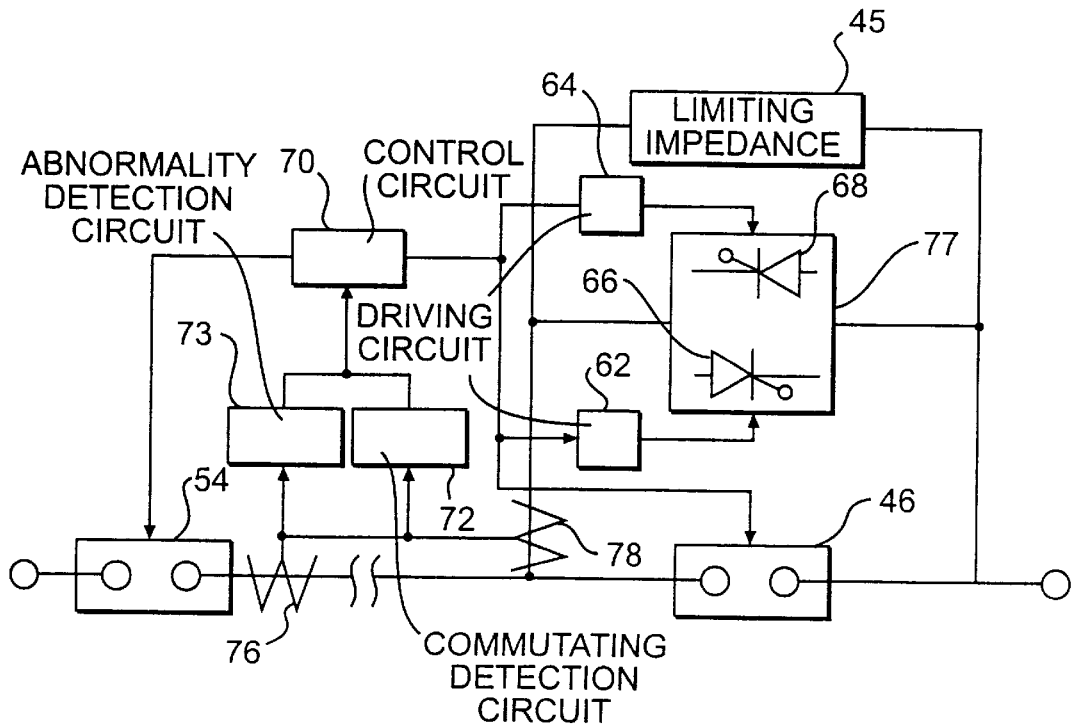
FIG. 16 is an example of the current limiting device and its control system shown in FIG. 14.

FIG. 16 shows the current limiting device constituted by such a current limiter and its control system. In this example, solid-state switch 77 is inserted in the main circuit, and current-limiting impedance 45 and mechanical switch 46 are connected to solid-state switch 77 in parallel therewith. In each element 66 and 68 (constituting solid-state switch 77) for controlling the forward direction electric current and the reverse electric, switching signals are supplied to each gate from driving circuits 62 and 64. On the other hand, in the main circuit, provided near breaker 54 is electric current detector 76 comprising the main circuit electric current detecting means for detecting the electric current that flows in the main circuit, and provided near solid-state switch 77 is electric current detector 78 as the commutation detecting means for detecting the electric current flowing in solid-state switch 77. Electric current detectors 76 and 78 are installed at the position that primary winding 12a is held. The detection output of each of the electric current detectors 76 and 78 is supplied to abnormality detection circuit 73 and commutating detection circuit 72. Abnormality detection circuit 73 and commutating detection circuit 72 are constituted by structures such as those shown in FIG. 8 and FIG. 9, respectively.

Control circuit 70 in FIG. 16 is different from the case of the example shown in FIG. 7, therefore, it is necessary for mechanical switch 46 to control so as to synchronize with solid-state switch 77. Control circuit 70 inputs a high-level signal from abnormality detection circuit 73, which constitutes on-abnormality instruction means for giving an instruction of opening mechanical switch 46 and for giving an instruction for closing solid-state switch 77 in response to the signal. In addition, while control circuit 70 observes the detection output of commutating detection circuit 72 from the output of high-level commutating abnormality signal from commutating detection circuit 72 in the process of opening mechanical switch 46, control circuit 70 constitutes means for holding the conduction state of solid-state switch 77. When the above holding state exceeds a preset time, an auxiliary interrupting instruction means outputs an instruction for interrupting breaker 54. When control circuit 70 observes the detected output of commutating detection circuit 72 and the detected output of commutating detection circuit 72 is in the low level in the process of opening mechanical switch 46, the commutation is supposed to be at the normal state, and control circuit 70 constitutes the interrupting instruction means for instructing the interruption to solid-state switch 77 through driving circuits 62 and 64.

Figure 17:
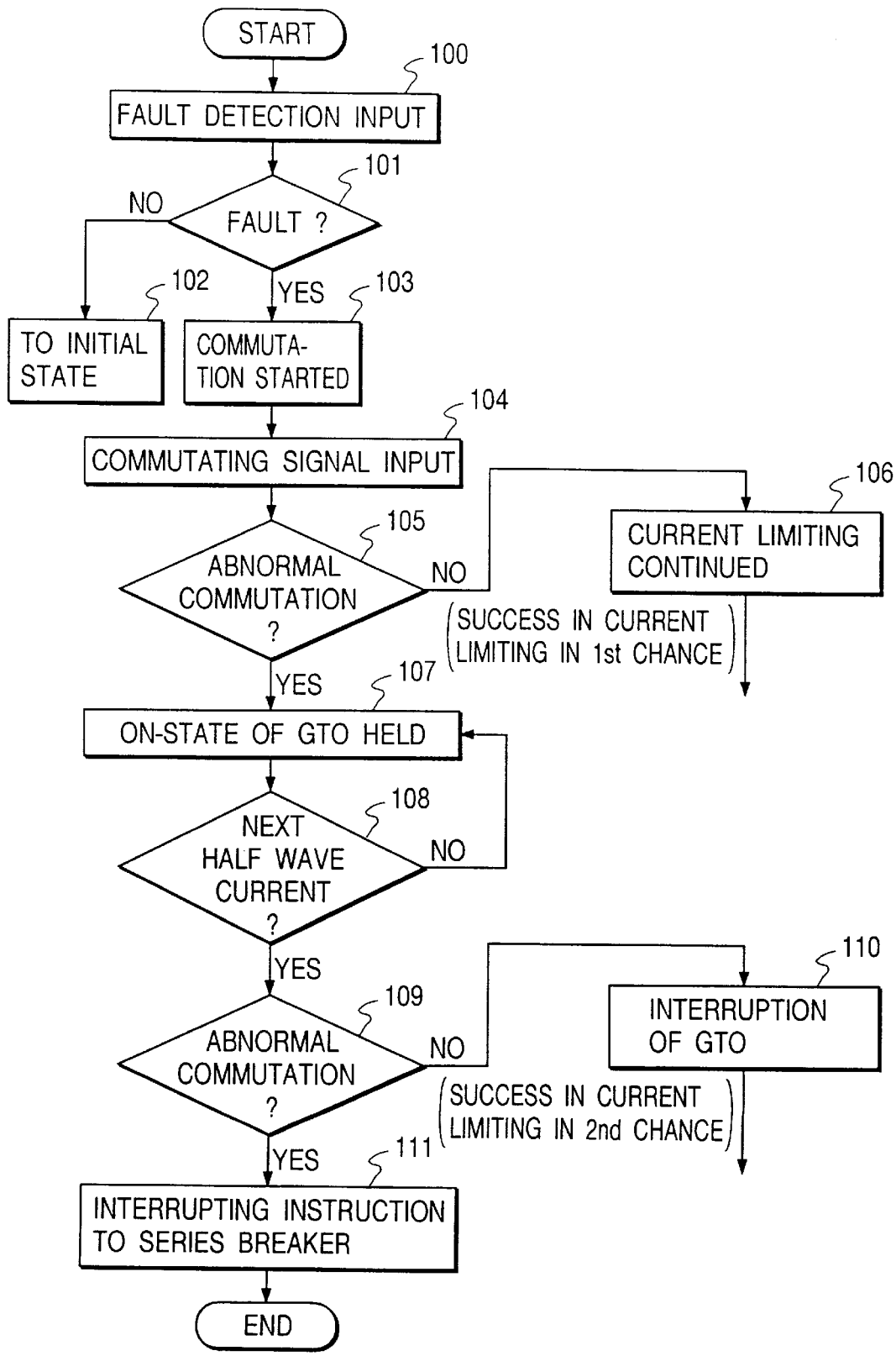
FIG. 17 is a flowchart that explains the action in the constitutional example of the current-limiter of this invention shown in FIG. 15.
Figure 18A:
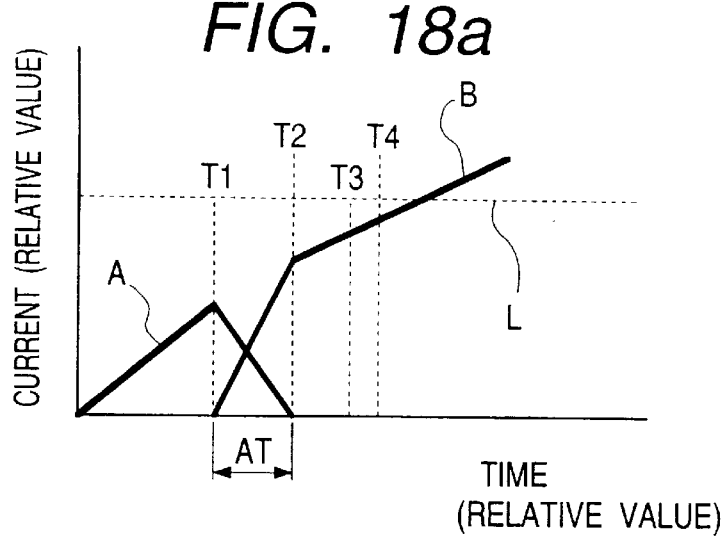
FIGS. 18a to 18c are time charts that explain the operation of each part in the constitutional example of the current limiter of this invention shown in FIG. 15.

Next, operations of this example are explained according to FIG. 17 and FIG. 18. First of all, the output of abnormality detection circuit 73 is input (step 100), to determine whether the abnormality occurs in the system connected to the main circuit (step 101). When the judgment is given as no abnormality, the operation returns to the initial state (step 102). On the other hand, when the judgment shows an abnormality, the commutating operation starts (step 103). That is, the control circuit instructs the opening of mechanical switch 46 and also instructs the closing of solid-state switch 77. At this time, the electric current flowing in mechanical switch 46 increases gradually as shown by characteristic A in FIG. 18(a), but when mechanical switch 46 starts the opening and commutation begins at the time T1 by arc voltage between both contactors, the main circuit electric current (characteristic A) decreases gradually. In this case, instead of decreasing the main circuit current, the electric current as shown in characteristic B flows in solid-state switch 77, and the current is perfectly commutated at the time T2. Similarly, after the commutating operation starts, the electric currents flowing in the main circuit current and in each solid-state switch 77 are observed. Namely, the output of commutating detection circuit 72 is observed (step 104), and it is judged whether the commutation abnormality has occurred (step 105). As is shown in FIG. 18(a) at this time, when the judgment is given as both values of the main circuit electric current (characteristic A) and the electric current flowing in solid-state switch 77 (characteristics B) do not exceed the preset value of the overcurrent (in other words, when a signal of a low level occurs from OR circuit 94), the interruption is instructed to solid-state switch 77 at the time T3, and the interruption of solid-state switch 77 is certainly carried out at the time T4. The level at this time is a controllable electric current level L or less that can cut off each solid-state switch 77, whereby the interruption can be done in the state of protecting solid-state switch 77.

Figure 18B:
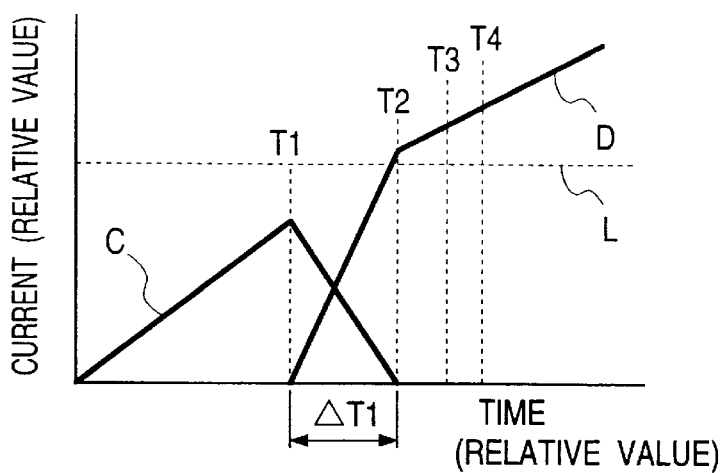
Figure 18C:
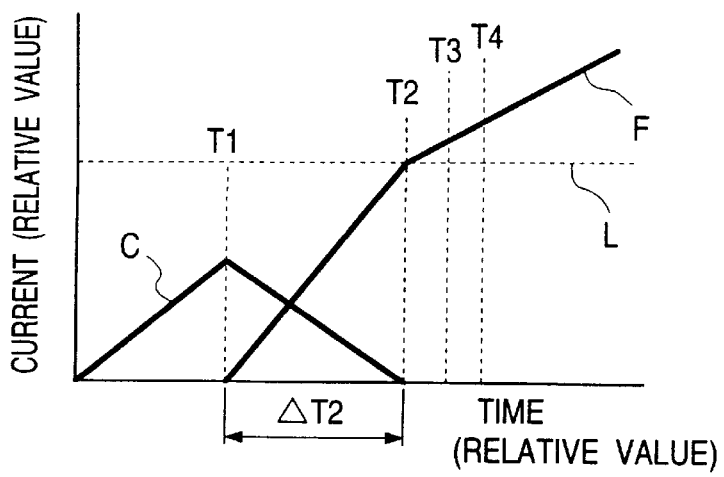

Further, as is shown in characteristic graphs C and D in FIG. 18(b), the time for starting the commutation is long, or as shown in characteristics E and F in FIG. 18(c), commutation time A T2 is long. When the main circuit electric current exceeds the preset value, or when the electric current flowing in solid-state switch 77 exceeds the preset value of the overcurrent, a high-level signal is output from commutating detection circuit 72 and is judged as a commutation abnormality. At this time, the interruption is impossible at controllable electric current level L or less; therefore, the conduction state for solid-state switch 77 is held (step 107). This conduction state is continued until the following half wave current at which the phase of the accident electric current reverses (step 108). Then, it is again judged whether there is a commutation abnormality or not (step 109). When there is no commutation abnormality, the interruption is instructed to solid-state switch 77 (step 110). When the commutation abnormality is judged again, the interruption is instructed to breaker 54 in the state of holding solid-state switch 77 (step 111), and the breakage of solid-state switch 77 caused by the following commutation abnormality is prevented. In this example, in the case where the abnormality occurs, as solid-state switch 77 is interrupted only on the normal state of the commutation in the process of opening mechanical switch 46, the breakage of solid-state switch 77 can be prevented, even when the time for starting the commutation is delayed because of the instability of the arc that occurs at the time of opening mechanical switch 46 or the commutation time is long needed.

In the above example, at the time of the commutation abnormality, while solid-state switches 77 are made to operate together under the same condition, in case of maintaining the same state that current continues to flow in some solid-state switches and other solid-state switches are being interrupted, the interruption at the following half wave electric current is certainly carried out.

As to current-limiting impedance 45 used as the above mentioned limiting device, a resistor, a reactor and a resistor having a nonlinear characteristic are possible. In case of using the resistor, there is rarely the overvoltage, relatively, when the overcurrent is commutated from mechanical switch 46 or solid-state switch 77. On the other hand, when the reactor is used as current-limiting impedance 45, the electric current can flow easily for a long time, because the heat loss of the reactor is less tan that of the resistor in the case of flowing the overcurrent continuously.

When the resistor comprising a nonlinear characteristic is used as current-limiting impedance 45, the overvoltage can be naturally prevented from occurring, because the resistance value of the resistor falls in the case of the overvoltage.

Figure 19:
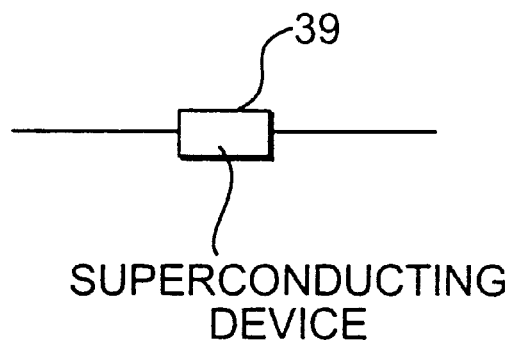

FIG. 19 is an example of superconducting device 39 as the current limiting device used for the current limiter of this invention. With regard to the current limiting operation used the superconducting device, a method for limiting the current by increasing the impedance because of quenching the superconducting device in which the overcurrent flows may be employed, or a method my be used for limiting the current by increasing the inductance of the reactor released a magnetic shield by quenching the superconducting device, where the inductance of the reactor is decreased by magnetic shielding of the superconducting device. In the case where the current limiting device is composed of superconducting device 39, coolants such as liquid helium, etc, are needed to cool the superconducting device. These coolants have low dielectric strength, which becomes the weakness from the viewpoint of the insulation related to the current limiter used for the high voltage system. However, in the structure of the current limiter of this invention, the voltage withstand level is not applied directly to the current limiting device itself; therefore, these coolants are advantageous for the current limiting device that uses the superconducting device from the insulation point of view. Even if the overcurrent flows, the abnormal condition of this electric current is detected at high speed, the operation of the switching gear or the solid-state switch is enabled at high speed, and as a result, overcurrent or over voltage do not occur, by preventing the abnormality.

Figure 20:
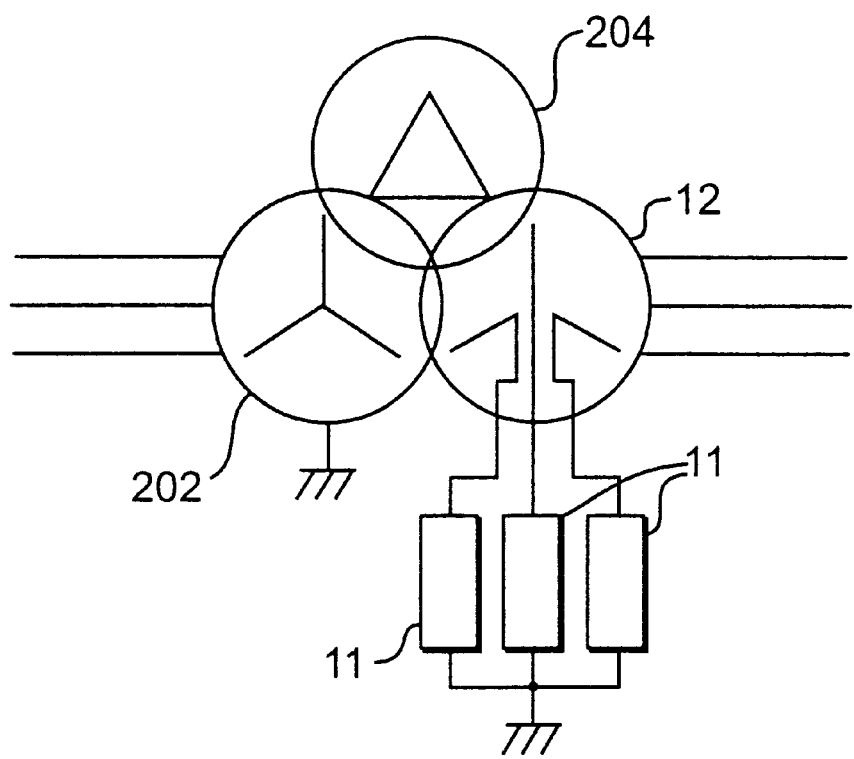

This invention can be applied to a transformer composed of star-connection 12, star-connection 202 and delta-connection 204 shown in FIG. 20. In this case also, by providing the current limiter of this invention to either one of the star-connections that constitute the transformer, the overcurrent can be prevented at the time of the abnormality is the power line. In addition, this invention can be applied not only to the transformer for a power transmission line but also to various kinds of transformers for general electric power lines.

What is claimed is:

1. A current limiter for suppressing an overcurrent flowing through a three-phase electric power system, comprising:

first, second, and third current limiting devices respectively inserted between a low potential terminal of, each winding of a three-phase transformer and a ground point thereof, each said current limiting device controlling an electric current of the phase of its respective winding.

2. The current limiter according to claim 1, wherein each said current limiting device includes a switching gear having a mechanical contactor and a current limiting element connected in parallel with said switching gear.

3. The current limiter according to claim 2, wherein said switching gear is provided with a circuit for forcibly making a zero cross point of an electric current that flows in said mechanical contactor.

4. The current limiter according to claim 2, wherein each said current limiting device includes a switch using a semiconductor device connected in parallel with the current limiting element.

5. The current limiter according to claim 1, wherein each said current limiting device includes a main circuit switch inserted in a power line and a solid-state switch connected in parallel with said main circuit switch; and wherein the current limiter further comprises:

power line abnormality detecting means for detecting an electric power abnormality that occurs in said power line;

abnormality instruction means for giving an instruction of opening said main circuit switch in response to a detected output by said power line abnormality detecting means and for giving said instruction of closing said solid-state switch at the time of an abnormal current;

main circuit electric current detecting means for detecting said electric current of said main circuit;

commutating current detecting means for detecting said electric current flowing through said solid-state switch;

main circuit electric current judgment means for judging whether a detected output of said main circuit electric current detecting means exceeds a preset value of said abnormality;

commutating electric current judgment means for judging whether said detected output of said commutating detecting means exceeds said preset value of said abnormality; and interruption instruction means for giving an instruction of an interruption to said solid-state switch in the process of opening said main circuit switch, when both said main circuit electric current judgment means and said commutating electric current judgment means judge that said preset valve has been exceeded.

6. The current limiter according to claim 5, further comprising:
means for holding the conduction state of said solid-state switch when said solid-state switch conducts by instruction of said electric power line abnormality detecting means due to said commutating electric current detecting means showing an abnormal value of said detected electric current.

7. The current limiter according to claim 6, further comprising:
auxiliary interruption instruction means for giving an instruction of an interruption to a breaker connected in series with said main circuit switch, when the time for holding said solid-state switch exceeds a preset time.

8. The current limiter according to claim 5, further comprising:
means for holding the conduction state of said solid-state switch when the output of one of said main circuit electric current judgment means and said commutating electric current judgment means is affirmative under the condition that said solid-state switch is turned on by instruction of said electric power line abnormality detecting means.

9. The current limiter according to claim 1, wherein a voltage which occurs when each said current limiting device carries out a limiting operation is less than a withstanding voltage between said low potential terminal of said winding of said transformer and ground.

10. The current limiter according to claim 9, wherein each said current limiting device includes a main circuit switch inserted in a power line and a solid state switch connected in parallel with said main circuit switch, and wherein the current limiter further comprises:
auxiliary interrupting instruction means for giving an instruction of an interruption to a breaker connected in series with said solid-state switch, when the time for holding a conduction state of said solid-state switch exceeds a preset time.

11. The current limiter according to claim 10, wherein the preset time for holding the conduction state of said solid-state switch is set up in correspondence to a time period necessary for reversing a phase of current when an abnormality occurs in said power line.

12. A current limiter for suppressing an overcurrent flowing through an electric power system, including first, second, and third current limiting devices respectively inserted between each low potential terminal of each phase of a star-connection of a three-phase transformer and a ground point thereof;
wherein each said current limiting device includes a switching gear having a mechanical contactor and a current limiting element.

13. The current limiter according to claim 12, wherein said current limiting element is connected in parallel with said switching gear.

14. The current limiter according to claim 12, wherein each said current limiting device includes a switch using a semiconductor device connected in parallel with the current limiting element.

15. The current limiter according to claim 12, wherein said switching gear is provided with a circuit for forcibly making a zero cross point of an electric current that flows in said mechanical contactor.

16. The current limiter according to claim 12, wherein each said current limiting device includes a main circuit switch inserted in a power line and a solid-state switch connected in parallel with said main circuit switch; and
wherein the current limiter further comprises:
power line abnormality detecting means for detecting an electric power abnormality that occurs in said power line;
abnormality instruction means for giving an instruction of opening said main circuit switch in response to a detected output by said power line abnormality detecting means and for giving said instruction of closing said solid-state switch at the time of an abnormal current;
main circuit electric current detecting means for detecting said electric current of said main circuit;
commutating current detecting means for detecting said electric current flowing through said solid-state switch;
main circuit electric current judgment means for judging whether a detected output of said main circuit electric current detecting means exceeds a preset value of said abnormality;
commutating electric current judgment means for judging whether said detected output of said commutating detecting means exceeds said preset value of said abnormality; and
interruption instruction means for giving an instruction of an interruption to said solid-state switch in the process of opening said main circuit switch, when both said main circuit electric current judgment means and said commutating electric current judgment means judge that said preset valve has been exceeded.

17. The current limiter of claim 16, further comprising:
means for holding the conduction state of said solid-state switch when the output of one of said main circuit electric current judgment means and said commutating electric current judgment means indicates an abnormality under the condition that said solid-state switch is turned on by instruction of said electric power line abnormality detecting means.

18. The current limiter according to claim 17, further comprising:
auxiliary interruption instructing means for giving an instruction of an interruption to a breaker connected in series with said main circuit switch, when the time for holding said solid-state switch exceeds said preset time.

19. The current limiter according to claim 12, wherein each said current limiting device has a superconductor element as said current limiting element, that increases impedance by collapse of the superconducting state of said superconductor element.

20. The current limiter according to claim 12, wherein each said current limiting device has a resistor as said current limiting element, whose resistance value has non-linear characteristics.

21. The current limiter according to claim 12, wherein said switching gear limits electric current by an arc that occurs between contacts of said mechanical contactor.

22. The current limiter according to claim 12, wherein a voltage which occurs when each said current limiting device carries out a limiting operation is less than a withstanding voltage between said low potential terminal of said winding of said transformer and ground.

23. The current limiter according to claim 12,
wherein said switching gear includes a solid-state switch inserted in said electric power line;
wherein said current limiting element is connected in parallel with said solid-state switch; and
wherein said current limiter further comprises:
abnormal electric current detecting means for detecting an abnormal electric current said electric power line;
interruption instruction means for giving an interruption to said solid-state switch in response to a detected output of said abnormal electric current detecting means;
main circuit electric current detecting means for detecting said electric current flowing in said solid-state switch; and
means for holding the conduction state of said solid-state switch when said detected electric current of said main circuit electric current detecting means is abnormal in the process of turning off said solid-state switch.

24. The current limiter according to claim 23, further comprising auxiliary interruption instruction means for giving an instruction of an interruption to a breaker connected in series with said solid-state switch, when the time for holding the conduction state of said solid-state switch exceeds a preset time.

25. The current limiter according to claim 24, wherein the preset time for holding the conduction state is set up in correspondence to a time period necessary for reversing a phase of current at the time that an abnormality is detected by said abnormal electric current detecting means.

26. A current limiter for suppressing an overcurrent flowing through a three-phase electric power system, including first, second, and third current limiting devices respectively inserted between a low potential terminal of a winding of each phase of a star-connection of a three-phase transformer and a ground point thereof;
wherein each said current limiting device includes a switch using a semiconductor element and a current limiting element.

27. The current limiter according to claim 26, wherein said switch is provided with a circuit that forcibly makes a zero cross point of an electric current that flows in said semiconductor element.

28. A current limiter, comprising:
first, second, and third current limiting devices, each including a main circuit switch inserted in an electric power line, and a solid-state switch connected in parallel with said main circuit switch;
power line abnormality detecting means for detecting an electric power abnormality that occurs in said power line;
abnormality instruction means for giving an instruction of opening said main circuit switch and for giving an instruction of closing said solid-state switch in response to a detected output by said power line abnormality detecting means;
commutating electric current detecting means for detecting an electric current flowing through said solid-state switch; and
on-and-off means for opening said solid-state switch when said detected electric current of said commutating electric current detecting means shows a normal current value.

29. The current limiter according to claim 28, further comprising:
means for holding the conduction state of said solid-state switch when said solid-state switch conducts by instruction of said electric power line abnormality detecting means due to said commutating electric current detecting means showing an abnormal value.

30. The current limiter according to claim 28, further comprising:
means for holding the conduction state of said solid-state switch when said solid-state switch conducts by instruction of said electric power line abnormality detecting means due to said commutating electric current detecting means showing an abnormal value; and
auxiliary interruption instruction means for giving an instruction of an interruption to a breaker connected in series with said main circuit switch, when the time for holding said solid-state switch exceeds a preset time.

31. A current limiter for suppressing an overcurrent flowing through a three-phase electric power line system, comprising:
power line abnormality detecting means for detecting an electric power abnormality that occurs in said three-phase electric power line system, and
current limiting means for individually controlling an electric current of each phase of a three-phase transformer in the three-phase electric power line system, when said power line abnormality detects means detecting an electric power abnormality.

32. The current limiter according to claim 31, wherein said current limiting means includes a switching gear having a mechanical contactor and a current limiting element connected in parallel with said switching gear.

33. The current limiter according to claim 31, wherein said current limiting means includes a switch using a semiconductor device and a current limiting element connected in parallel.

34. A current limiter for suppressing an overcurrent flowing through a three-phase electric power system, which has three current limiting devices, comprising:
each winding of a three-phase transformer connected to one side of a respective one of the three current limiting devices,
the other side of each of the three current limiting devices being connected to a ground point; and
each of the three current limiting devices controlling an electric current of the phase of its respective winding.

35. The current limiter according to claim 34, wherein each said current limiting device includes a switching gear having a mechanical contactor and a current limiting element connected in parallel with said switching gear.

36. The current limiter according to claim 34, wherein said current limiting device includes a switch using a semiconductor device and a current limiting element connected in parallel.

37. The current limiter according to claim 34, wherein a voltage which occurs when each said current limiting device carriers out a limiting operation is less than a withstanding voltage between said low potential terminal of said winding of said transformer and ground.

* * * * *